United States Patent [19]

Wrobel et al.

[11] Patent Number: 4,581,805

[45] Date of Patent: Apr. 15, 1986

[54] WIRE-MARKING CLIP APPLICATOR

[75] Inventors: Norbert E. Wrobel, Marine on St. Croix; Gerald W. Johannsen, White Bear Lake, both of Minn.

[73] Assignee: Minnesota Mining and Manufacturing Company, St. Paul, Minn.

[21] Appl. No.: 740,402

[22] Filed: Jun. 3, 1985

[51] Int. Cl.[4] .......... B23P 11/02

[52] U.S. Cl. .......... 29/453; 29/243.56; 29/745; 29/235

[58] Field of Search .......... 29/235, 243.56, 453, 29/745

[56] References Cited

U.S. PATENT DOCUMENTS

| | | | |
|---|---|---|---|
| 2,764,160 | 9/1956 | Alexander et al. | 29/235 |
| 4,034,450 | 7/1977 | Carlomagno et al. | 29/745 |
| 4,432,124 | 2/1984 | Breuers | 29/235 |

*Primary Examiner*—James L. Jones, Jr.
*Attorney, Agent, or Firm*—Donald M. Sell; Terryl K. Qualey; James A. Smith

[57] ABSTRACT

A wire-marking clip applicator includes a holder which carries a number of wands, each carrying a unique set of marked C-shaped clips that can be individually dispensed onto a wire from a flared shoe at the end of each wand. Such clip-dispensing wands have been used for the same purpose in the prior art, but the holder makes it possible for the first time to mark a wire with differently numbered clips without picking up, using, and laying down a wand. The holder preferably is formed with a central longitudinal passage into which a wire to be marked can be inserted if one end of the wire is disconnected, thus positioning every flared shoe close to the wire for quickly and easily transfering clips onto the wire.

14 Claims, 7 Drawing Figures

WIRE-MARKING CLIP APPLICATOR

FIELD OF THE INVENTION

The invention concerns an applicator for applying wire-marking clips, specifically C-shaped clips now in widespread use. Usually each clip carries a single alphanumeric character, and a large number of identically marked clips are carried by a wand from which the clips are transfered onto wires.

BACKGROUND ART

A typical C-shaped wire-marking clip has a chevron shape as shown in German Offenlegungschrift No. 2,655,958 which was laid open June 15, 1978. As there illustrated in FIG. 4, a large number of identically marked clips are carried by a wand, one end of which has a flared shoe to spread the clips sufficiently to fit onto a wire. For marking wires, each of ten such wands may carry clips marked with a different digit from 0 to 9, and additional wands may carry clips marked with alphabetic characters. Numbering of each wire requires one to handle individually each wand that carries a character to be applied to a wire.

A number of similar wire-marking wands and clips are marketed by other manufacturers. It is believed that all such wands on the market are plastic, and most are quite flexible and hence difficult to handle. At least one wand (SCN-07 of W. H. Brady Co., Milwaukee, WI) is formed with a bulbous longitudinal rib which stiffens the wand, thus making it easier to use. Another wand has ribs extending along the edges of its shoe to prevent the clips from rotating while they are pushed onto a wire.

DISCLOSURE OF INVENTION

The invention provides a wire-marking clip applicator which carries a number of wands, each of which can carry a different set of identically marked clips, thus permitting several differently marked clips to be quickly and easily applied to a wire. The invention makes it possible for the first time to mark one or more wires with differently marked clips without picking up, using, and laying down individual wands. Briefly, the wire-marking clip applicator of the invention comprises

- an elongated, generally cylindrical holder formed with a plurality of longitudinal channels, each of which opens through a constriction at the external surface of the holder, and
- a plurality of wands, each wand having an elongated body for carrying a large number of C-shaped marking clips, a longitudinal rib having a bulbous extremity that can be lockingly wedged past the constriction into one of said channels, and a flared clip-dispensing shoe which extends beyond an end of the holder when the bulbous extremity is wedged into the channel.

Each longitudinal rib preferably is formed to have an elongated protrusion between its bulbous extremity and the clip-carrying body of the wand, which protrusion rests against the external surface of the holder when the bulbous extremity is wedged into one of the channels of the holder. This stabilizes the wand and keeps the wands uniformly spaced. The longitudinal rib preferably is formed with a thin neck between said protrusion and the clip-carrying body of the wand, thus permitting the ends of the C of each C-shaped marker to nearly touch each other, as they do in the prior art.

The holder of the novel wire-marking clip applicator preferably is formed with a central longitudinal passage into which a wire to be marked can be inserted if one end of the wire is disconnected. This places the flared shoes of the wands close to the wire, thus enhancing the transfer of clips. The holder and wands should be formed to permit the flared shoe of each wand to overhang either end of the holder. When the shoe of every wand overhangs the same end of the holder, several differently marked clips can be slipped quickly onto a wire which has been fed into the central longitudinal passage. However, when both ends of a wire are connected so that it cannot be inserted into the central passage of the holder, the shoes may be mounted so that half overhang one end and half overhang the other such that no shoe is between the wire and the shoe from which a clip is being dispensed.

The holder and wands preferably incorporate means for preventing a wand from sliding longitudinally along the channel in which it is wedged. This may be accomplished by a protuberance from the external surface of the holder, which protuberance fits into a slot formed in the longitudinal rib of the wand. Preferably the protuberance is near one end of the holder, and a said slot is formed in the rib near each end of the wands to permit each wand to be reversed.

A preferred wire-marking clip applicator of the invention is formed with ten longitudinal channels for receiving the wands, each carrying clips numbered from 0 to 9. For greater marking versatility, clips marked with alphabetic or other characters or symbols may be carried by one or more identical applicators of the invention.

THE DRAWING

In the drawing, all figures of which are schematic:

Figures 1, 2, 3, 4:
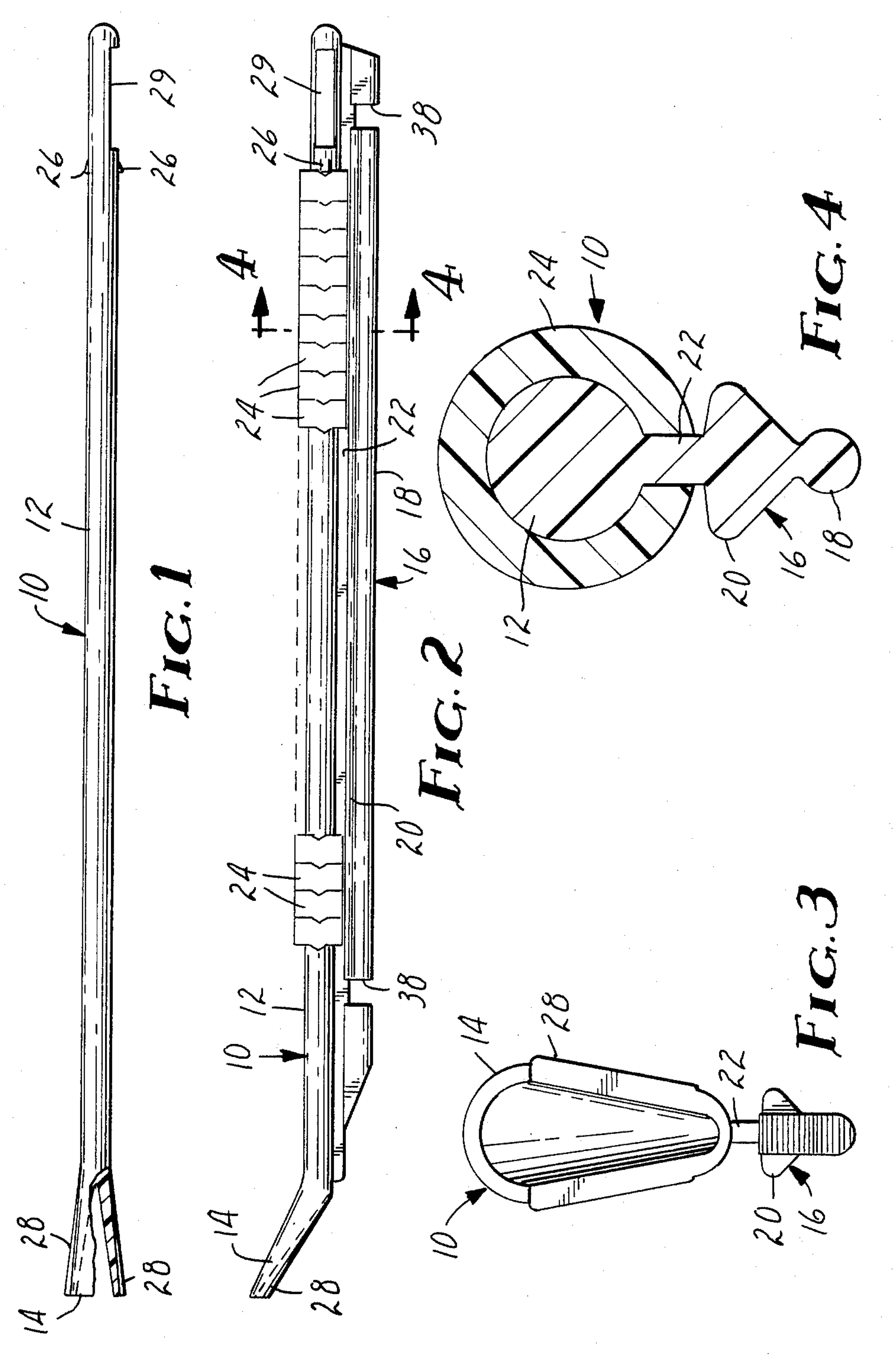
FIG. 1 is a top view of a wand which can be used in a wire-marking clip applicator of the invention.
FIG. 2 is a side elevation of the wand of FIG. 1 carrying a number of wire-marking clips.
FIG. 3 is an enlarged end view of the wand of FIG. 1.
FIG. 4 is a section along line 4—4 of FIG. 2, further enlarged.

Referring to FIGS. 1–4, a wand 10 has been molded of plastic in one piece consisting of a generally cylindrical body 12, a flared shoe 14 at one end of the body, amd a longitudinal rib 16 which includes a bulbous extremity 18, a generally triangular central protrusion 20, and a thin neck 22. A large number of C-shaped chevron clips 24 may be fitted over the body 12 as shown in FIG. 2. Two small ramps 26 permit one to slide the clips onto the body from the end opposite the shoe 14 while keeping the clips from sliding off that end. Along the full length of each edge of the shoe 14 is a small ridge 28 which prevents the clips from rotating as they are pushed over the shoe onto a wire. A flat 29 in the body 12 is a useful location for the manufacturer's logo, a common expedient of the prior art.

Figure 5:
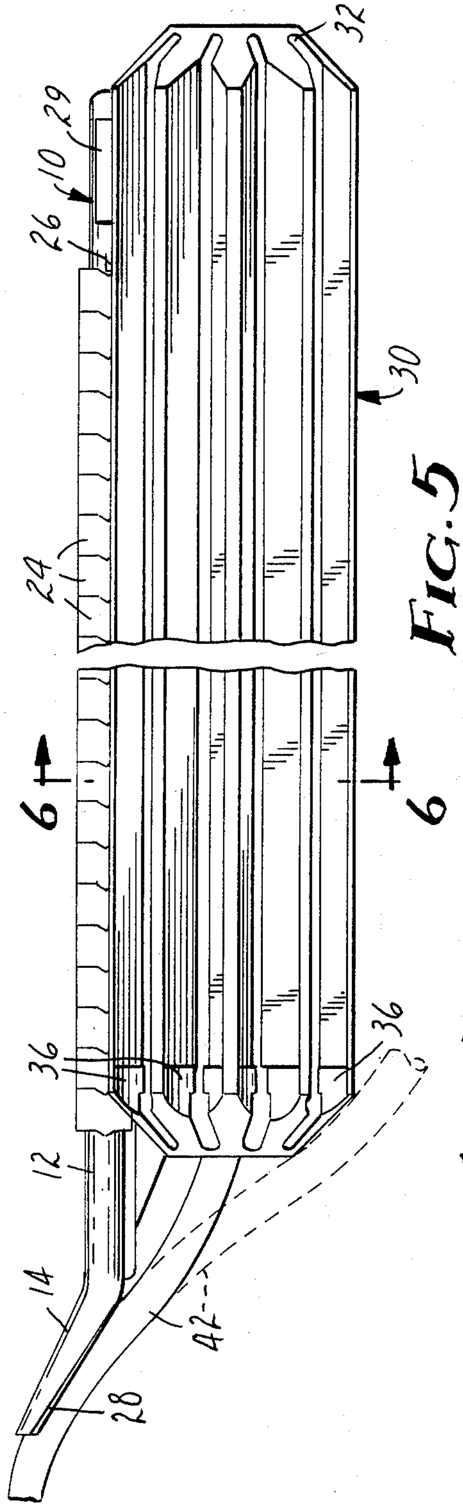
FIG. 5 is a side elevation of a holder with a wand of FIGS. 1–4 lockingly wedged into one of its channels, thus providing a wire-marking clip applicator of the invention.
Figure 7:
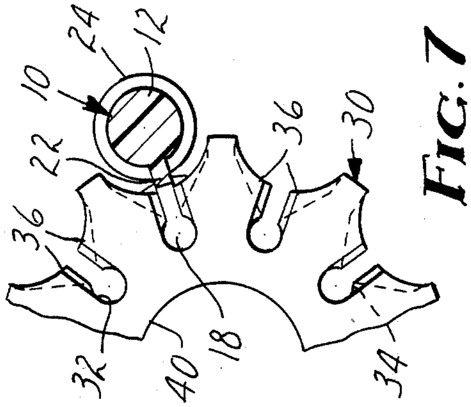
FIG. 7 is a fragmentary end view of the applicator of FIGS. 5 and 6.
Figure 6:
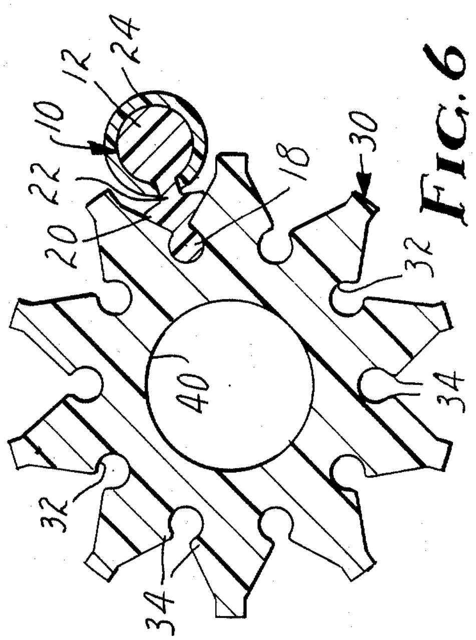
FIG. 6 is a section along line 6—6 of FIG. 5.

Shown in FIGS. 5–7 is a generally cylindrical holder 30 formed with ten longitudinal channels 32, each of which opens through the external surface of the holder. Upon inserting the bulbous extremity 18 of a wand 10 into a channel 32, a constriction 34 at the mouth of the channel prevents the wand from accidentally falling out. The generally triangular protrusion 20 of the longitudinal rib 16 rests against the external surface of the holder 30 as seen in FIG. 6, thus stabilizing and keeping the wands uniformly spaced.

Near one end of the holder 30, a pair of protuberances 36 from its external surface fit into one of a pair of slots 38 in the longitudinal rib 16 near each end of each wand 10, thus preventing the wand from sliding longitudinally along the channel into which its rib has been wedged. Because there is a slot 38 at each end of the wand, it can be reversed so that its flared shoe 14 can overhang either end of of the holder 30.

The holder 30 is formed with a central longitudinal passage 40 into which a wire 42 to be marked can be inserted as shown in FIG. 5 if one end of the wire is disconnected. This places the flared shoes of the wands close to the wire, thus enhancing the transfer of clips to the wire. On the other hand, when a wire to be marked is connected at both ends and thus cannot be inserted into the central passage 40, five consecutive shoes may be mounted to overhang one end while mounting the other five to overhang the other end of the holder. By doing so, no shoe is between the wire and the shoe from which a clip is being dispensed, and the shoe 14 can be brought close to the wire 42 as shown in dotted lines in FIG. 5.

The wands 10 preferably are molded from acetal plastic, as are many wands of the prior art, while the holder preferably is molded from polypropylene which is tough, flexible, and economical.

We claim:

1. Wire-marking clip applicator comprising
   an elongated, generally cylindrical holder formed with a plurality of longitudinal channels, each of which opens through a constriction at the external surface of the holder, and
   a plurality of wands, each wand having an elongated body for carrying a large number of C-shaped marking clips, a longitudinal rib having a bulbous extremity that can be lockingly wedged past the constriction into one of said channels, and a flared clip-dispensing shoe which extends beyond an end of the holder when the bulbous extremity is wedged into the channel.

2. Wire-marking clip applicator as defined in claim 1 wherein the longitudinal rib is formed to have an elongated protrusion between its bulbous extremity and the clip-carrying body of the wand, which protrusion rests against the external surface of the holder when the bulbous extremity is wedged into one of the channels.

3. Wire-marking clip applicator as defined in claim 2 wherein the longitudinal rib is formed with a thin neck between said protrusion and the clip-carrying body of the wand.

4. Wire-marking clip applicator as defined in claim 1 wherein the holder is formed with a central longitudinal passage into which a wire to be marked can be inserted to enhance the transfer of clips onto the wire.

5. Wire-marking clip applicator as defined in claim 1 including means for preventing a wand from sliding longitudinally along the channel in which it is wedged.

6. Wire-marking clip applicator as defined in claim 5 wherein said means for preventing sliding is provided by a protuberance from the external surface of the holder, which protuberance fits into a slot formed in the longitudinal rib of the wand.

7. Wire-marking clip applicator as defined in claim 6 wherein said protuberance is near one end of the holder, and a said slot is formed in the rib near each end of each wand to permit each wand to be reversed so that its shoe can overhang either end of the holder.

8. Wire-marking clip applicator as defined in claim 1 wherein each of the wands and the holder is a single molded plastic piece.

9. Wire-marking clip applicator as defined in claim 8 wherein the plastic of the holder is polypropylene.

10. Wire-marking clip applicator as defined in claim 1 wherein the holder is formed with ten longitudinal channels.

11. Method of applying C-shaped marking clips to a wire comprising the steps of
   (a) making
      an elongated, generally cylindrical holder formed with a plurality of longitudinal channels, each of which opens through a constriction at the external surface of the holder, and
      a plurality of wands, each wand having an elongated body for carrying a large number of C-shaped marking clips, a longitudinal rib having a bulbous extremity that can be lockingly wedged past the constriction into one of said channels, and a flared clip-dispensing shoe;
   (b) fitting onto the body of each wand a different set of identically marked clips;
   (c) then wedging the bulbous extremity of the longitudinal rib of each wand into one of the longitudinal channels with its shoe extending beyond an end of the holder; and
   (d) pushing individual clips from the wands onto the wire to mark the wire.

12. Method as defined in claim 11 wherein step (a) involves forming a central longitudinal passage through the holder, and an end of the wire is inserted into the passage prior to step (d).

13. Method as defined in claim 11 wherein step (c) involves wedging the bulbous extremity of the longitudinal rib of each wand into a longitudinal channel with every shoe overhanging the same end of the holder.

14. Method as defined in claim 11 wherein step (a) involves forming the holder with an even number of channels, and step (c) involves positioning the wands so that diametrically opposite shoes overhang opposite ends of the holder.

* * * * *